(No Model.)
A. E. HARDY.
GOVERNOR FOR STEAM ENGINES.
No. 314,528. Patented Mar. 24, 1885.
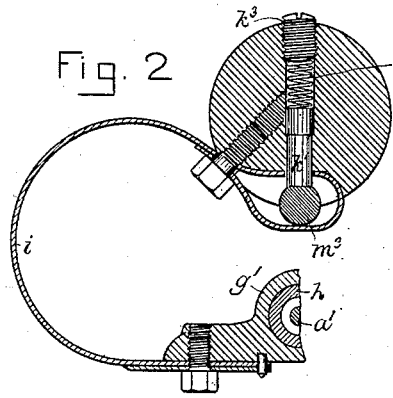
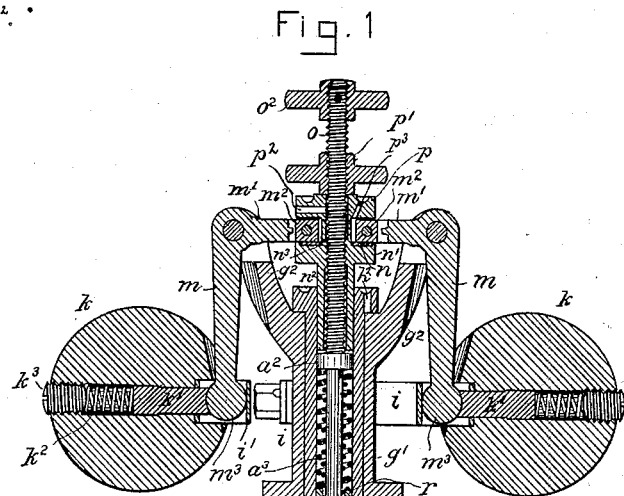
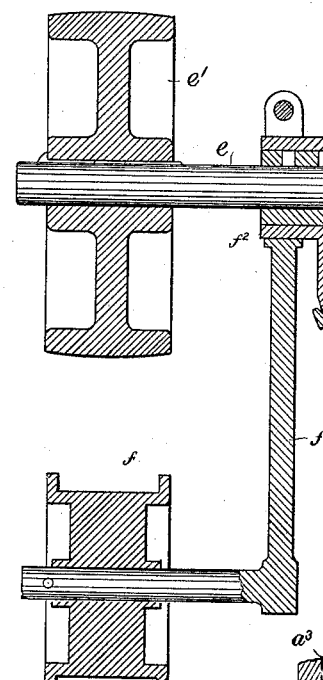
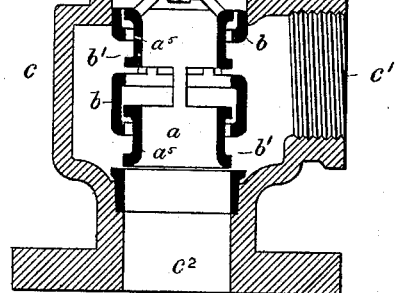
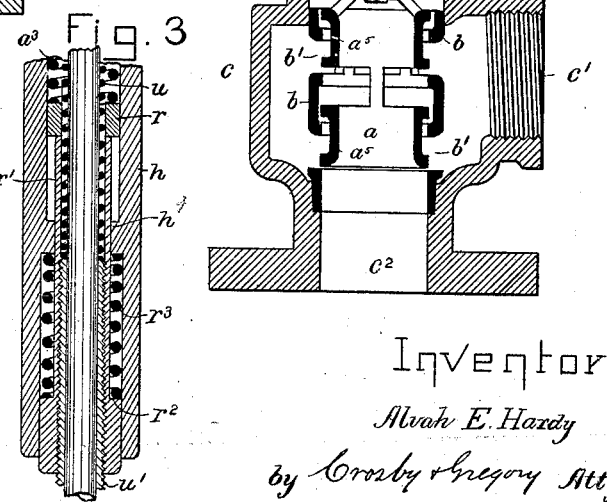
Witnesses
B. J. Noyes.
W. H. Seyton.
Inventor
Alvah E. Hardy
by Crosby & Gregory Attys

UNITED STATES PATENT OFFICE.

ALVAH E. HARDY, OF EVERETT, ASSIGNOR TO EDWARD DEWEY & CO., OF BOSTON, MASSACHUSETTS.

GOVERNOR FOR STEAM-ENGINES.

SPECIFICATION forming part of Letters Patent No. 314,528, dated March 24, 1885.

Application filed September 29, 1884. (No model.)

*To all whom it may concern:*

Be it known that I, ALVAH E. HARDY, of Everett, county of Middlesex, State of Massachusetts, have invented an Improvement in Governors for Steam-Engines, of which the following description, in connection with the accompanying drawings, is a specification, like letters on the drawings representing like parts.

My invention relating to governors is intended as an improvement on a governor of the class shown in Letters Patent No. 110,703, dated January 3, 1871, in which the revolving governor balls or weights are supported on spring-arms which act in opposition to the centrifugal force, the said weights operating upon pivoted arms by which the valve controlling the flow of steam to the engine is actuated.

The present invention consists in various details of construction, hereinafter pointed out. The weights are provided with yielding engaging devices for the valve-actuating arms, by means of which the said arms are more intimately connected with the said weights, and respond with greater accuracy to the movement of the said balls, produced by centrifugal force, and whereby a greater or less amount of friction may be produced for resisting such movement, and thereby render it more gradual and steady.

The invention also consists in a novel stopping or checking device, whereby the valve is automatically closed in case the operation of the governor is stopped, as by the breakage of its actuating-belt; and the invention further relates to novel devices for lubricating the valve-actuating arms and for regulating and varying the speed at which the engine controlled by the governor is to operate.

Figure 1 is a vertical section of a governor embodying this invention; Fig. 2, a horizontal sectional detail; Fig. 3, a longitudinal sectional detail enlarged; and Fig. 4 a detail of the lubricating device in a horizontal position, also enlarged.

The flow of steam from the boiler or steam-generator to the engine is controlled by a valve, $a$, having a longitudinal movement in a valve seat or cylinder, $b$, contained in a case, $c$, having an inlet-opening, $c'$, and outlet-opening $c^2$, the said case $c$ constituting the base or support for the operative parts of the governor. The said base is surmounted by a bracket, $d$, having a bearing, $d'$, for the main actuating-shaft $e$ of the governor, provided with a pulley, $e'$, to be driven by a belt from some part of the engine to be governed, the said belt sustaining an idle-pulley, $f$, supported upon an arm, $f'$, which may be fastened in adjusted position upon a hub, $f^2$, free to turn on the portion $d'$ of the bracket $d$. The shaft $e$ is provided with a toothed gear, $e^2$, meshing with a toothed gear, $g$, upon a hollow shaft or barrel, $g'$, turning on a tubular post or upright, $h$, supported in a socket, $d^2$, of the bracket $d$. The said tubular shaft $g'$ has attached to it the springs $i\ i'$, which support the weights or balls $k$, which are caused to revolve with the shaft $g'$, overcoming the elasticity of the said springs $i\ i'$, and moving radially outward from the said shaft as the speed of rotation and consequent centrifugal force acting on the said weights increases. The weights $k$ in their outward and inward movement, produced by variations in speed, act upon the valve-actuating arms or levers $m$, pivoted in lugs $g^2$ on the tubular shaft $g'$. The arms $m'$ of the lever $m$ are provided with bearing-pieces $m^2$, resting on a washer, $n$, held loosely in a recess in a flange, $n'$, of a tube, $n^2$, having a free longitudinal movement in the upper end of the post $h$, the said tube being moved downward or into the said post when the weights $k$ move outward, upon an increase in their speed of revolution. The tube $n^2$ is provided with a rod, $o$, which is screw-threaded, or otherwise adapted to be longitudinally adjusted in the said tube $n^2$, and upon the said rod $o$ is placed a ring or cap, $p$, which is held close to the bearing-pieces $m^2$ by means of a nut, $p'$, on the threaded rod $o$, which is itself provided with a suitable handle, $o^2$, by which it may be turned to adjust it longitudinally in the tube $n^2$. The cap $p$ rests on a portion of the tube $n^2$ above the flange $n'$, and when in place constitutes a second flange, between which and the one $n'$ the arms of the valve-actuating levers revolve. The rod $o$ bears upon the upper end of the valve-stem $a'$, thus tending to move the said valve-stem and valve downward and reduce the supply of steam when the governor-weights $k$ move outward. The valve-stem $a'$ is provided at its upper end with a flange or collar, $a^2$, acted upon by a spring, $a^3$, which keeps the end of the valve-stem in engagement with the rod $o$, tending to raise the valve-stem and open the valve when the weights $k$ move inward under the force of the springs $i$, when the speed of revolution and consequent centrifugal force is diminished. The spring $a^3$ is supported at its lower end on a ring or washer, $r$, having a free longitudinal movement in the post $h$, which is, however, provided with an internal annular projection, $h'$, limiting the movement of the washer $r$, which is normally sustained in the position to keep the spring $a^3$ somewhat compressed by a tube, $r'$, entering the lower end of the post $h$, and provided with a shoulder, $r^2$, acted upon by a spring, $r^3$, interposed between the said shoulder and the internal projection, $h'$, in the post. The tube $r'$ is normally supported upon one arm of a lever, $t$, having its fulcrum $d^3$ in a portion of the bearing $d'$, the other arm of the said lever being normally engaged by a finger, $f^3$, on the hub $f^2$, connected with the arm $f'$, thus keeping the spring $r^3$ compressed, and also forming the proper support for the spring $a^3$. The arm $f'$ may be set at any desired angle with relation to the projection $f^3$, and will be so placed that the weight of the said arm and pulley $f$ will rest upon the belt that actuates the pulley $e'$, and when thus supported the projection $f^3$ will engage the lever $t$. In case, however, the said actuating-belt should break, the said pulley $f$ would fall, turning the hub $f^2$, and thus disengaging the projection $f^3$ from the lever $t$, which would consequently no longer support the tube $r$, and the latter would be thrown downward by the spring $r^3$, thus leaving the spring $a^3$ unsupported, so that the valve-rod $a'$ and valve would be permitted to drop; and to insure the downward movement or closing of the valve when the tube is thus released the valve-rod is provided with an adjustable engaging-piece, $a^4$, which will be struck by the end of the tube $r'$, causing the latter to be moved in the proper direction to close the valve $a$. The tube $r'$ thus constitutes a stopping device, and the engaging-piece $a^4$ is made adjustable, so that the movement of the valve, produced by the tube $r'$ and spring $r^3$ when thus released, may be regulated according as it is desired to wholly close the valve, or merely to partially close the same, so that the speed of the engine will not be too great when the governor ceases to operate. The valve $a$ consists of a hollow piston provided with annular grooves $a^5$, the edges of which control annular ports $b'$ in the cylinder $b$, that is fitted within the valve-casing $c$. The different portions of the valve $a$ control the flow of steam over both edges of each of the ports $b'$, that flowing over the lower edge of the lower port passing directly to the passage $c^2$, while that flowing over the other edges passes downward through the interior of the valve to the said passage. The ends of the springs $i$ $i'$, that are connected with the weights $k$, are bent to form a loop, as shown in Fig. 2, and the levers $m$ are provided with spherical ends $m^3$, placed within the said loops, so as to cause the said levers to accompany the weights in their radial or centrifugal movement. The weights $k$ are provided with bearing-pieces $k'$, acted upon by springs $k^2$, the pressure of which may be adjusted by screws $k^3$, thus confining the ends $m^3$ of the levers $m$ between the springs $i$ $i'$ and bearing-pieces $k'$ with a yielding pressure, which prevents looseness or lost motion between the said weights and levers, and also produces an adjustable amount of friction which resists the movement of the said parts, making it more uniform and gradual. The governor is shown in Fig. 1 as standing with the valve-rod and concentric parts in a vertical position, the weights $k$ revolving about a vertical axis; but it is obvious that the governor will operate equally well in other positions, and it is frequently desirable to place it in other positions, especially with the axis of revolution of the weights horizontal.

In order to lubricate the contacting-surface of the bearing-pieces $m^2$ with the washer $n$, the bore of the flange or cap $p$ and portion of the tube $n^2$ between the said cap $p$ and flange $n'$ is somewhat larger than the external diameter of the rod $o$, thus forming an oil-chamber around the said rod; and the said cap $p$ is provided with an oil-passage, $p^2$, for conveying oil to the said chamber, the said oil being delivered through a passage, $n^3$, in or near the flange $n'$ upon the surface of the washer $n$. (See Fig. 4.) The bearing of the tubular shaft or barrel $g'$ on the post $h$ is lubricated through a passage, $h^2$. The passage $p^2$ may be used for lubricating the washer $n$ when the governor is operating in a horizontal position, and when it is in a vertical position the lubricant may be applied through a passage, $p^3$, leading from a groove in the upper side of the cap $p$. The pressure of the spring $a^3$ acts to resist the separation or outward movement of the weights $k$, and it is sometimes desirable to further oppose the centrifugal force, so that a higher speed will be required to separate the said weights in order to cause the valve $a$ to close. Such additional opposing force may be applied by an auxiliary spring, $u$, acting on the under side of the collar or flange $a^2$, the force of the spring being adjusted by means of a screw, $u'$, and thus enabling the speed at which the engine may run to be adjusted without varying the weights or their main supporting-springs $i$ $i'$, or their position with relation to the valve.

The adjustment of the spring $u$ may be effected while the governor is running.

The spring $u$ and its adjusting device are shown more clearly in Fig. 3.

I claim—

1. In a governor for steam-engines, the combination, with the valve and revolving weights controlling the same, of the spring-actuated stopping device, for wholly or partially closing the valve, and the lever, whereby the said stopping device is retained inoperative while the governor is properly actuated, substantially as described.

2. In a governor for steam-engines, the combination of the valve and revolving weights controlling the same with the spring-actuated stopping device and the lever and idle-pulley, whereby the said stopping device is retained inoperative while the governor-actuating belt is in its normal operative condition, substantially as described.

3. In a governor, the combination of the revolving weights and their supporting-springs with the valve-actuating levers and yielding bearing-pieces engaging the said levers, substantially as described.

4. The combination of the revolving weights and their supporting-springs with the valve-actuating levers, bearing-pieces engaging said levers and springs, and adjusting devices whereby the pressure of said bearing-pieces and the consequent frictional resistance to the movement of the parts may be regulated, substantially as described.

5. The combination of the revolving weights and valve-actuating arms or levers with a rod provided with flanges or collars engaged by the levers, the said collars being provided with an oil-chamber surrounding the rod, and an inlet-passage to said chamber in one flange or collar, and an outlet-passage in the other flange or collar, substantially as described.

6. In a steam-engine governor, the combination, with the revolving weights and valve-stem and valve controlled thereby, of an auxiliary spring acting upon the said valve-stem, whereby the effect of the weights thereon may be varied, substantially as described.

7. In a governor for steam-engines, the combination of the valve-stem and revolving weights controlling the same with the spring-actuated stopping device and engaging projection on the valve-stem co-operating therewith, substantially as described.

In testimony whereof I have signed my name to this specification in the presence of two subscribing witnesses.

ALVAH E. HARDY.

Witnesses:
JOS. P. LIVERMORE,
B. J. NOYES.